(12) United States Patent
Yee et al.

(10) Patent No.: US 7,407,106 B2
(45) Date of Patent: Aug. 5, 2008

(54) METHOD AND SYSTEM FOR HIDING VISIBLE INFRARED MARKINGS

(75) Inventors: Dawson Yee, Clyde Hill, WA (US); Thomas D. Mehlhaff, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 10/951,492

(22) Filed: Sep. 28, 2004

(65) Prior Publication Data

US 2006/0066564 A1 Mar. 30, 2006

(51) Int. Cl.
  *G06K 7/10* (2006.01)
(52) U.S. Cl. .................. 235/468; 235/454; 235/462.01; 235/494
(58) Field of Classification Search .................. 235/454, 235/455, 462.01, 468, 494
See application file for complete search history.

(56) References Cited

U.S. PATENT DOCUMENTS

| 4,992,650 | A | | 2/1991 | Somerville .................. 235/462 |
| 6,112,982 | A | * | 9/2000 | Ahlquist et al. ............. 235/375 |
| 6,766,953 | B1 | * | 7/2004 | Huston et al. .......... 235/462.05 |
| 2003/0052179 | A1 | * | 3/2003 | Pinson ........................ 235/494 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Seung H Lee
(74) *Attorney, Agent, or Firm*—Workman Nydegger

(57) ABSTRACT

A marking carried by a physical object and discernible by an infrared (IR) sensor is at least partially concealed from the human eye. The marking is covered with a coating that is at least partially opaque in the visible spectrum and at least partially transparent in the IR spectrum (or other non-visible spectrum). The marking is thus not apparent to a human eye or to visible light sensors, while remaining discernible in the IR spectrum. Using the present invention to prevent a user from detecting the marking adds intrigue to the detection of the object, since the workings of the IR sensor that enable the sensor to identify the marking are not evident to a user. The present invention is also beneficially employed in games where it is desirable that an opponent be unable to see a marking that is detectable by the IR sensor.

42 Claims, 10 Drawing Sheets

OTHER PUBLICATIONS

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp. printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions.* New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp. search results, 21pp. article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer user Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5, pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp.)

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop and Displays." *UIST '03*, Vancouver, B.C., Canada. © 2003 ACM 1-58113-636-6/03/0010. pp. 193-202.

\* cited by examiner

METHOD AND SYSTEM FOR HIDING VISIBLE INFRARED MARKINGS

FIELD OF THE INVENTION

The present invention generally pertains to a computing system having a detector operable to recognize objects in proximity to an interactive display surface, and more specifically, to a computing system having a detector operable to detect markings that are not apparent to an unaided human eye.

BACKGROUND OF THE INVENTION

Because of the widespread popularity of computers, most people have become comfortable with conventional computer input devices such as keyboards and pointing devices. The keystrokes and movements of mice, trackballs, and joysticks are sufficiently intuitive to provide satisfactory interfaces for most computer-related tasks. Nonetheless, as computers become increasingly more indispensable, limits of a human-machine interface that depends upon pressing buttons and dragging a pointer with a mouse or other device tends to restrict how quickly and naturally computers can be used.

In seeking to further enhance the human-machine interface, ever-improving hardware capabilities have made possible systems that avoid the need to enter text with a keyboard. Personal digital assistants and tablet PCs can now recognize human handwriting. Speech recognition software enables users to operate computers and enter text by speaking into a microphone. Such systems can thus provide a more efficient and satisfying experience for users who prefer not to type on a keyboard or are less proficient in doing so.

As computers become more ubiquitous throughout our environment, the desire to make computers and their interfaces even more user-friendly continues to promote development in this area. For example, the MIT Media Lab, as reported by Brygg Ullmer and Hiroshi Ishii in "The metaDESK: Models and Prototypes for Tangible User Interfaces," *Proceedings of UIST*10/1997:14-17," has developed another form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface.

Others have been developing similar keyboardless interfaces. For example, papers published by Jun Rekimoto of the Sony Computer Science Laboratory, Inc. and associates describe a "HoloWall" and a "HoloTable" that display images on a surface and use IR light to detect objects positioned adjacent to the surface.

By detecting a specially formed object or by detecting IR-reflected light from an object disposed on a graphical display surface, the metaDESK can respond to the contemporaneous placement and movement of the object on the display surface to carry out a predefined function, such as displaying and moving a map of the MIT campus.

Thus, computing systems such as the HoloWall and metaDESK may provide a more natural degree of human-machine interaction by providing the means for a computer to respond to specific objects. However, while such systems enable a person to interact with a computer by engaging and moving a physical object instead of a keyboard or mouse, the quality of the experience can be undermined somewhat if the object bears a bar code or other visible code detectable by the detectors used in those systems that is also readily apparent to the user. Further, in the case of a game where it is desirable to keep secret a value or identity of a game piece or playing card, a visible code might give away the value or identity to a savvy, observant competitor.

In the latter case, the presence of a visible IR code may be masked with a filter that is transparent to IR light but opaque to visible light. With such a filter, the IR detectors might still detect the code on the physical object, but the users would not be able to see it. Thus, hiding the codes with filters can restore some of the mystique of the computing system that appears to recognize each object that is placed on an interactive surface, without any apparent way being provided to enable such recognition.

Unfortunately, the use of filters does not necessarily lend itself to every desired application. Attaching thick filters to surfaces of objects may be just as apparent, if not more conspicuous, than allowing the codes to remain visible. Further, attaching filters to thin objects may not be practical. For example, if a number of cards are to be encoded for use with such a system, applying filters might make the cards too large or clumsy to handle, to be convenient. Ultimately, it would be desirable to be able to encode objects discreetly, without making the markings visible or using conspicuous filters.

SUMMARY OF THE INVENTION

One of the advantages of the present invention is that it provides a method for concealing an IR-detectable marking from an unaided human eye. An IR sensor may be capable of detecting markings that are visible in the IR, non-visible spectrum, and the visible spectrum. For various reasons, it may be desirable for the marking to be discernible to an IR sensor, but not by the human eye. Using an object that has a marking not apparent to the user adds to the mystique when the IR sensor is able to discern the marking and recognize an object. As another example, the physical object may be a game piece, so that it would be desirable that the marking be discernible by the IR sensor, but not by an opponent, to prevent an identity or value of the game piece from being recognized by the opponent upon seeing the marking.

Although it is known to fit objects with lenses or filters that might limit the ability to identify a marking in a particular spectrum, the thickness of such lenses or filters would likely add undesirable mass, bulk, or thickness to an object. Thus, for example, if the objects that carry the markings are generally two-dimensional objects, such as tokens, chips, pucks, tiles, or playing cards, attaching a filter to the object to cover the marking may cause the object to be unwieldy. By contrast, embodiments of the present invention use a thin coating applied to the object that does not add significant bulk and does not make the object clumsy to handle.

One aspect of the present invention is thus directed to a method for concealing a marking discernible by an IR sensor. (While the present invention is clearly usable with markings that are detected by sensors responsive to other non-visible portions of the spectrum, such as the ultraviolet waveband, an initial embodiment is directed to an application that employs an IR sensor.) A portion of an object bearing the marking is identified. A fluid coating having the properties of at least partial opacity to light in the visible spectrum and at least partial transparency to light in the IR spectrum is chosen. The fluid coating is then applied over the marking such that the marking remains discernible in the IR spectrum while becoming at least partially invisible in the visible spectrum.

In accordance with one embodiment of the present invention, the object includes a game piece having at least one surface bearing content that an opponent should not be able to see during at least a portion of a game in which the game piece is used. The game piece may include, for example, a playing card, a chip, a puck, a tile, or a token.

The marking may include at least one coding scheme, such as a bar code, a matrix code, a radial code, or a gray scale code, or can be an identifiable differentiable shape. The fluid coating may include at least one of a paint, a lacquer, a varnish, or another fluid coating. For example, the fluid coating may include Liquitex® Acrylic Artistic Color acrylic paint in a Naphthol Crimson color. Alternatively, a plurality of fluid coatings may be applied such that the combination of fluid coatings disposed over the markings enable the markings to remain identifiable in the IR spectrum, while becoming largely invisible in the visible spectrum. For example, the fluid coatings may include Design Master™ Color Tool Spray Paints in the colors Deep Blue #743 and Cranberry #713. The fluid coating can be applied by brushing, spraying, dipping, pouring, or electrostatic deposition.

An embodiment of the present invention may further comprise choosing a thin substrate that is at least partially transparent in the visible and IR spectra. The fluid coating is applied to the thin substrate, and the thin substrate is attached to the object, over the marking. Thus, the fluid coating may be applied to a sheet of the thin substrate that is larger than the marking on the physical object. A section of the substrate is then cut from the substrate and applied over the marking.

The fluid coating possesses the properties of at least partial opacity to light in the visible spectrum and at least partial transparency to light in the IR spectrum when the fluid coating is dried and/or cured.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 6:
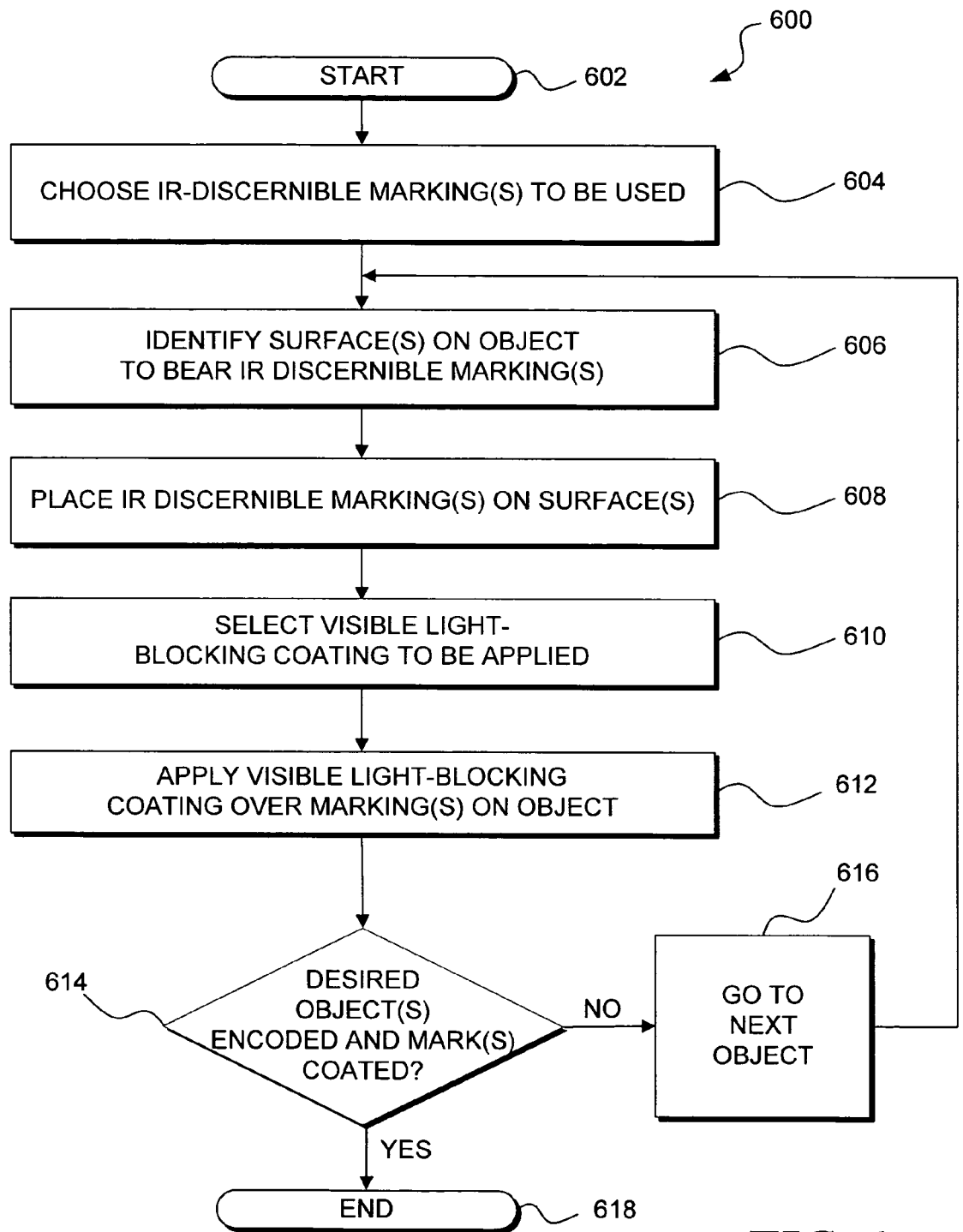

FIG. 6 is a flow diagram illustrating the logical steps for masking IR detectable codes in the visible spectrum according to an embodiment of the present invention; and FIGS. 7A-7G, 8A-8B, and 9 illustrate examples of applications for which visible light-blocking coatings according to embodiments of the present invention enhance the application by thinly covering IR-discernible markings to enable an IR vision system to detect optical codes while preventing human observers from viewing the markings.

DESCRIPTION OF THE PREFERRED EMBODIMENT

Exemplary Computing System for Implementing Present Invention

Figure 1:
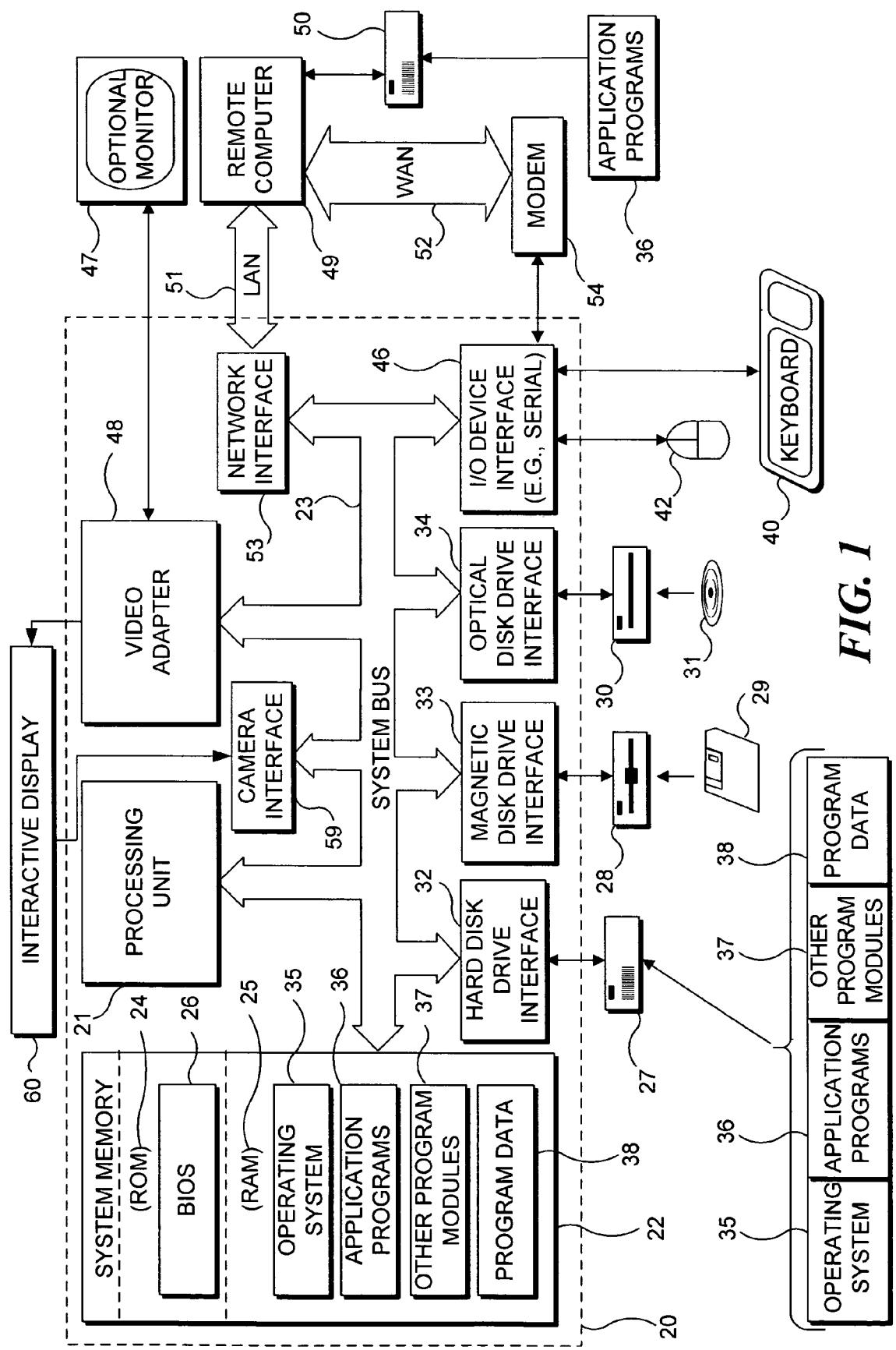
FIG. 1 is a functional block diagram of a generally conventional computing device or personal computer (PC) that is suitable for use with an interactive display surface in practicing the present invention.

With reference to FIG. 1, an exemplary system suitable for making use of embodiments of the present invention is shown. It will be appreciated, however, that visual concealment of IR-discernible markings have uses in a range of environments not limited to the system of FIG. 1. The system of FIG. 1 includes a general purpose computing device in the form of a conventional PC 20, provided with a processing unit 21, a system memory 22, and a system bus 23. The system bus couples various system components including the system memory to processing unit 21 and may be any of several types of bus strictures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with various types of interface device, such as printers, or the interactive display table of the present invention. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
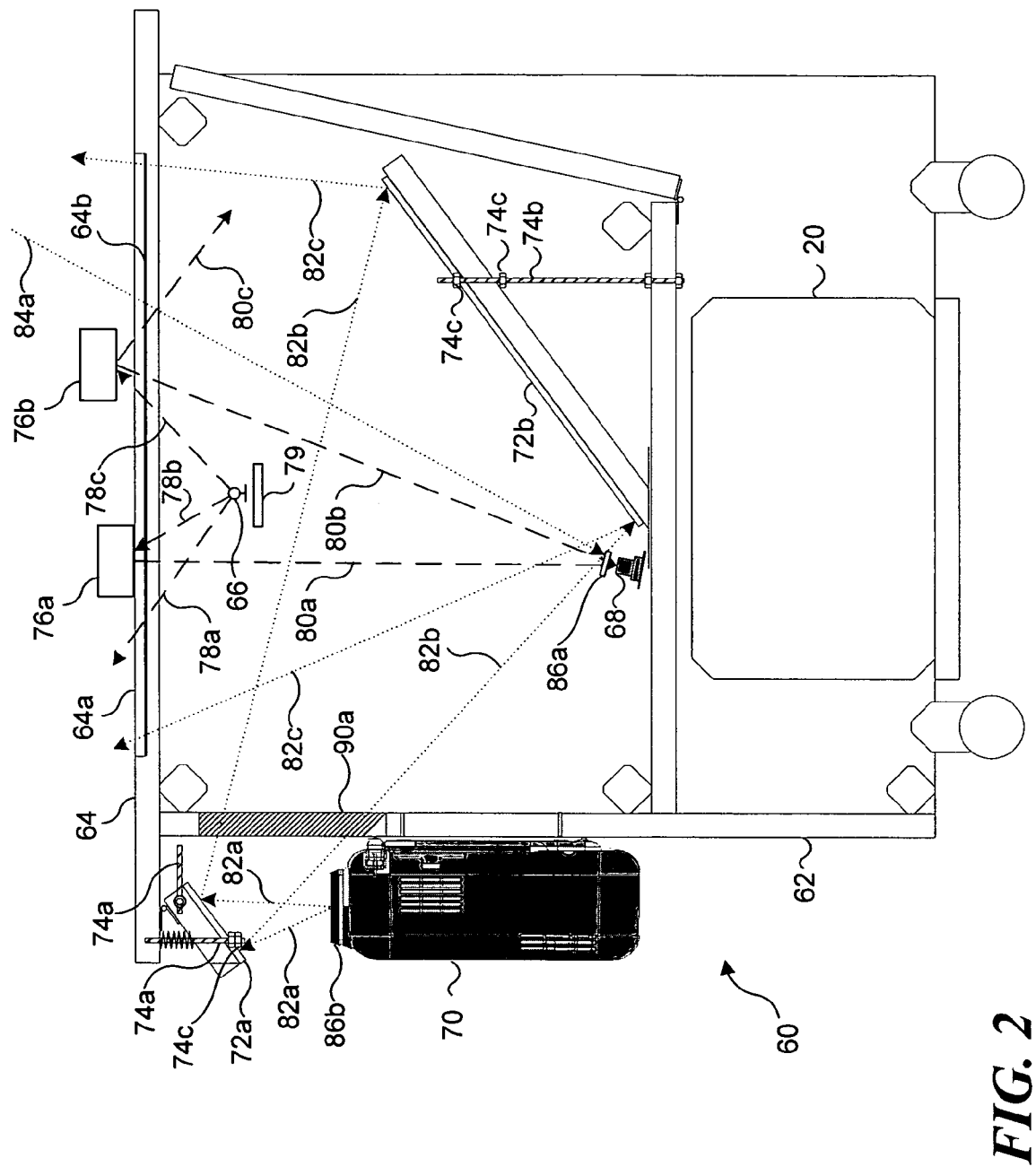
FIG. 2 is a cross-sectional view illustrating internal components of an interactive display surface in the form of an interactive table that includes an integral PC.

In FIG. 2, an exemplary interactive display table 60 is shown that includes PC 20 within a frame 62 and which serves as both an optical input and video display device for the computer. In this cut-away figure of the interactive display table 60, rays of light 82a-82c used for displaying text and graphic images are generally illustrated using dotted lines, while rays of IR light used for sensing objects on or just above a display surface 64a of interactive display table 60 are illustrated using dash lines. Display surface 64a is set within an upper surface 64 of interactive display table 60. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. As used herein and in the claims that follow in connection with objects positioned on or proximate to the interactive display surface, the term "adjacent to" is used with the intention that this term encompass both an object that is actually touching the interactive display surface as well as one that is just above the interactive display surface. Although only one IR source 66 is shown, it will be appreciated that a plurality of such IR sources may be mounted at spaced-apart locations around the interior sides of frame 62 to prove an even illumination of display surface 64a. The IR light produced by the IR sources may:

- exit through the table surface without illuminating any objects, as indicated by dash line 78a;
- illuminate objects on the table surface, as indicated by dash line 78b; or
- illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. Thus, both touch and hover objects are "adjacent to" the display surface, as that term is used herein. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display including ambient IR light that also travels along the path indicated by dotted line 84a.

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects such as hover object 76b that are closer to display surface 64a will reflect more IR light back to digital video camera 68 than objects of the same reflectivity that are farther away from the display surface. The digital video camera 68 senses the IR light reflected from "touch" and "hover" objects within its imaging field and produces a digital signal corresponding to images of the reflected IR light that is input to the PC 20 for processing to determine a location of each such object, and optionally, the size, orientation, and shape of the object. It should be noted that a portion of an object, such as a user's forearm, may be above the table while another portion, such as the user's finger, is in contact with the display surface. In addition, an object may include an IR light reflective pattern or coded identifier, such as a bar code, on its bottom surface that is specific to that object or to a class of related objects of which that object is a member. Accordingly, the imaging signal from the digital video camera 68 can also be used for detecting each such specific object, as well as determining its orientation, based on the IR light reflected from its reflective pattern, in accord with the present invention.

Embodiments of the present invention thus are operable in connection with recognizing an object and/or its position relative to the interactive display surface 64a by detecting its identifying characteristics using the IR light reflected from the object. The logical steps implemented to thus detect and identify an object and its orientation are explained in the commonly-assigned patent applications, including application Ser. No. 10/814,577, entitled "Identification Of Object On Interactive Display Surface By Identifying Coded Pattern," and application Ser. No. 10/814,761, entitled "Determining Connectedness And Offset Of 3D Objects Relative To An Interactive Surface," both of which were filed on Mar. 31, 2004. The disclosure and drawings of these two patent applications are hereby specifically incorporated herein by reference.

Figure 3:
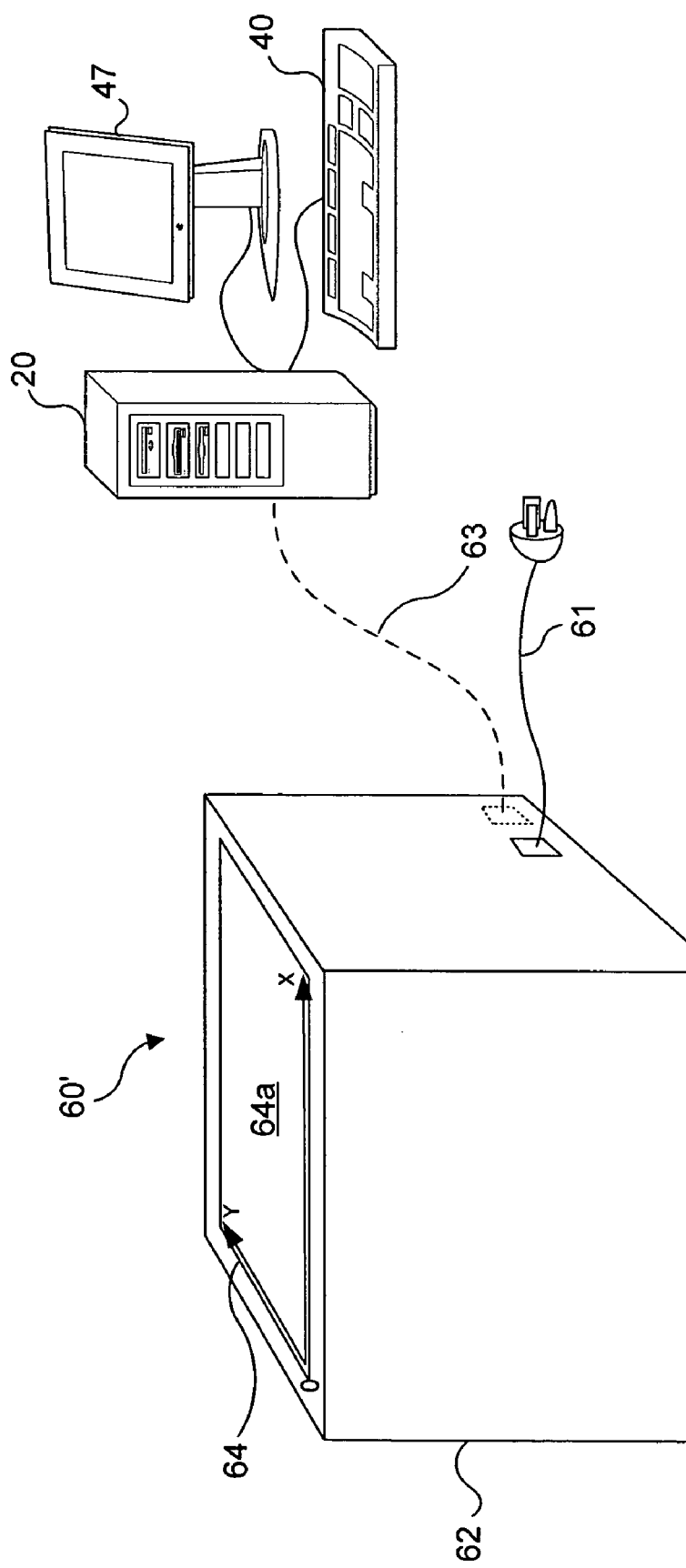
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high-speed wireless connection, or via some other appropriate wired or wireless data communication link. Whether included internally as an integral part of the interactive display, or externally, PC 20 executes algorithms for processing the digital images from digital video camera 68 and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable an interaction between the graphic image or virtual environment visible on display surface 64a and identify objects that are resting atop the display surface, such as object 76a, or are hovering just above it, such as object 76b.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCOS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Representative Forms of IR-Detectable Markings

Any type of marking or optical code recognizable by a sensor or camera may be used with embodiments of the present invention to provide input to an application executing on an interactive display system. So long as the marking or code is made with a material that reflects light in the IR spectrum (or optionally, in a ultraviolet (UV) spectrum if an appropriate UV light sensor is used), any optical marking or coding scheme can be used. Exemplary embodiments of a method and system for detection of optical codes are described in the above-referenced, co-pending and commonly assigned U.S. patent application Ser. No. 10/814,577, entitled "Identification Of Object On Interactive Display Surface By Identifying Coded Pattern," which was filed on Mar. 31, 2004.

Figure 4A:
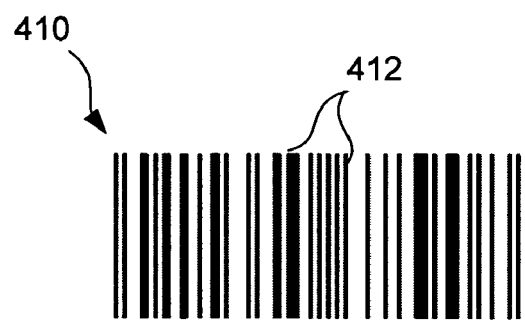
FIGS. 4A-4C illustrate exemplary optical codes that may be applied to objects so that the objects are detectable by an IR vision system.
Figure 4B:
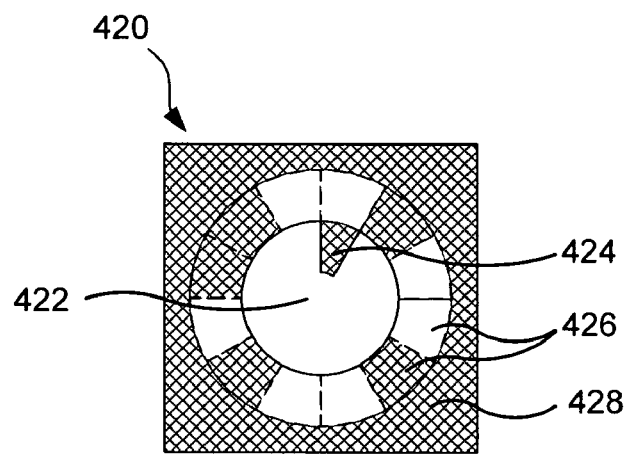
Figure 4C:
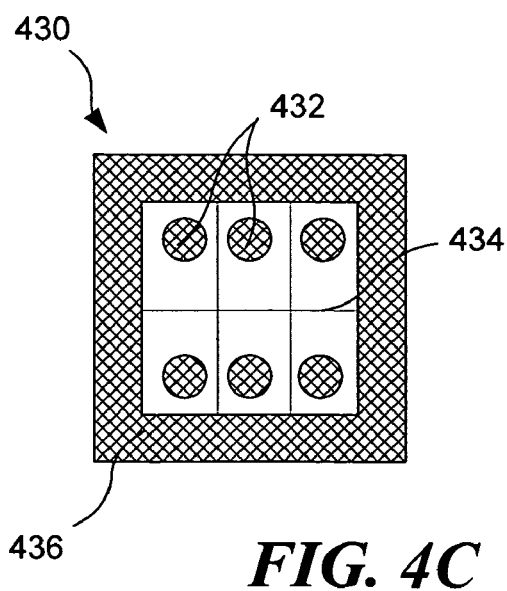

FIGS. 4A-4C provide three examples of optical codes suitable for use in connection with the present invention, although, it will be understood that many other optical codes can instead be used. As shown in FIG. 4A, a conventional bar code 410 can be used as the marking for a physical object. The sequence and width of bars 412 in the bar code 410 represent a value that can be detected by the vision sensing system of the interactive display system of FIG. 2. The value encoded in bar code 410 may be associated or associable with a function, action, or other entity in an application executing on the interactive display system. Positioning bar code 410 in contact with interactive display surface 64a thus invokes the associated function, action, or entity, as described above.

FIG. 4B illustrates a radial code 420. Radial code 420 includes a reflective inner circular area 422 with a darkened start bit 424. (It will be understood that the inverse of the reflective and the darkened areas noted can alternatively be used in almost any of these optical codes.) Start bit 424 is preferably located at a predefined first radius from the center of the coded region, and can take the shape of a keystone, a pie slice, or any other shape that makes the start bit easy to locate. Start bit 424 within light reflective inner circular area 422 defines a starting reference point from which the code value can be determined. Radial code 420 also comprises an outer, evenly divided first annulus 426, with a series of light and dark keystone-shaped data bits presenting the value of radial code 420. The value of radial code 420 is read starting from the location of start bit 424 in a predefined clockwise (or alternatively, in a predefined counterclockwise) direction. An outer area 428 sets off radial code 420 from surrounding portions of the image or other optical codes to facilitate detection and identification.

FIG. 4C illustrates a matrix code 430. Matrix code 430 is an exemplary form of a matrix code in the form of a die matrix code having from one to six data bits 432 or die spots arranged in six predetermined patterns within a 3×3 grid 434. Data bits 432 are read from grid 434 and compared to each of six allowable die face patterns as well as to one or more versions of the die face patterns rotated by some predefined angle, e.g., 45°, relative to the patterns shown in FIG. 4C. A matrix code 430 of almost any size and associated die face bit pattern can be read. An outer area 436 sets off matrix code 430 from surrounding portions of the image or other optical codes to facilitate detection and identification.

Other encoding schemes, including shapes differentiable by size and/or form, and any other form of optical encoding scheme presenting codes that is optically identifiable and distinguishable by an appropriate vision sensing system is usable with the present invention.

Cross-Sectional View of Coating Masking IR Markings

Figure 5A:
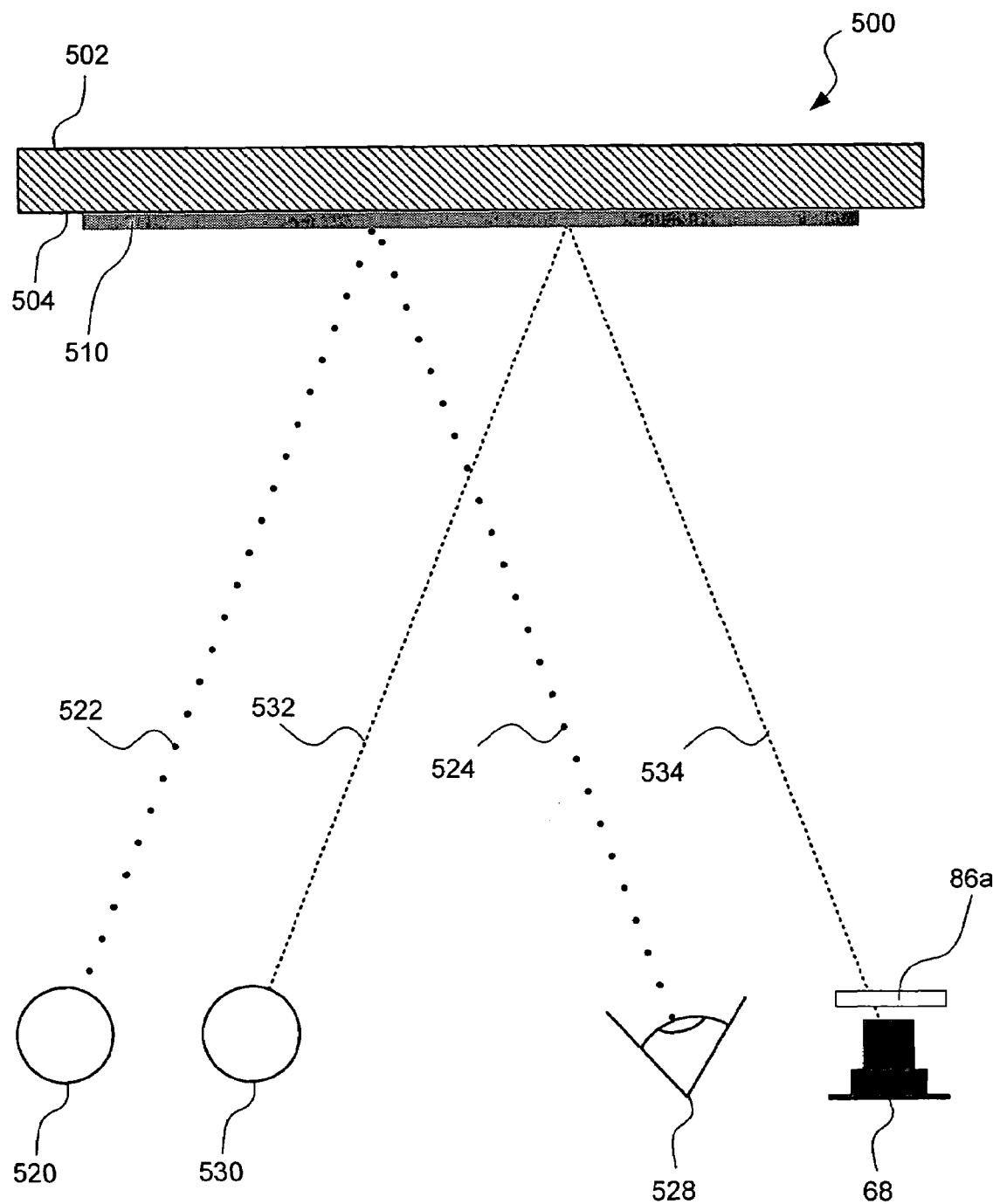
FIG. 5A illustrates an enlarged cross-sectional view of art encoded item with the marking not concealed and thus, visibly apparent to a human observer.
Figure 5B:
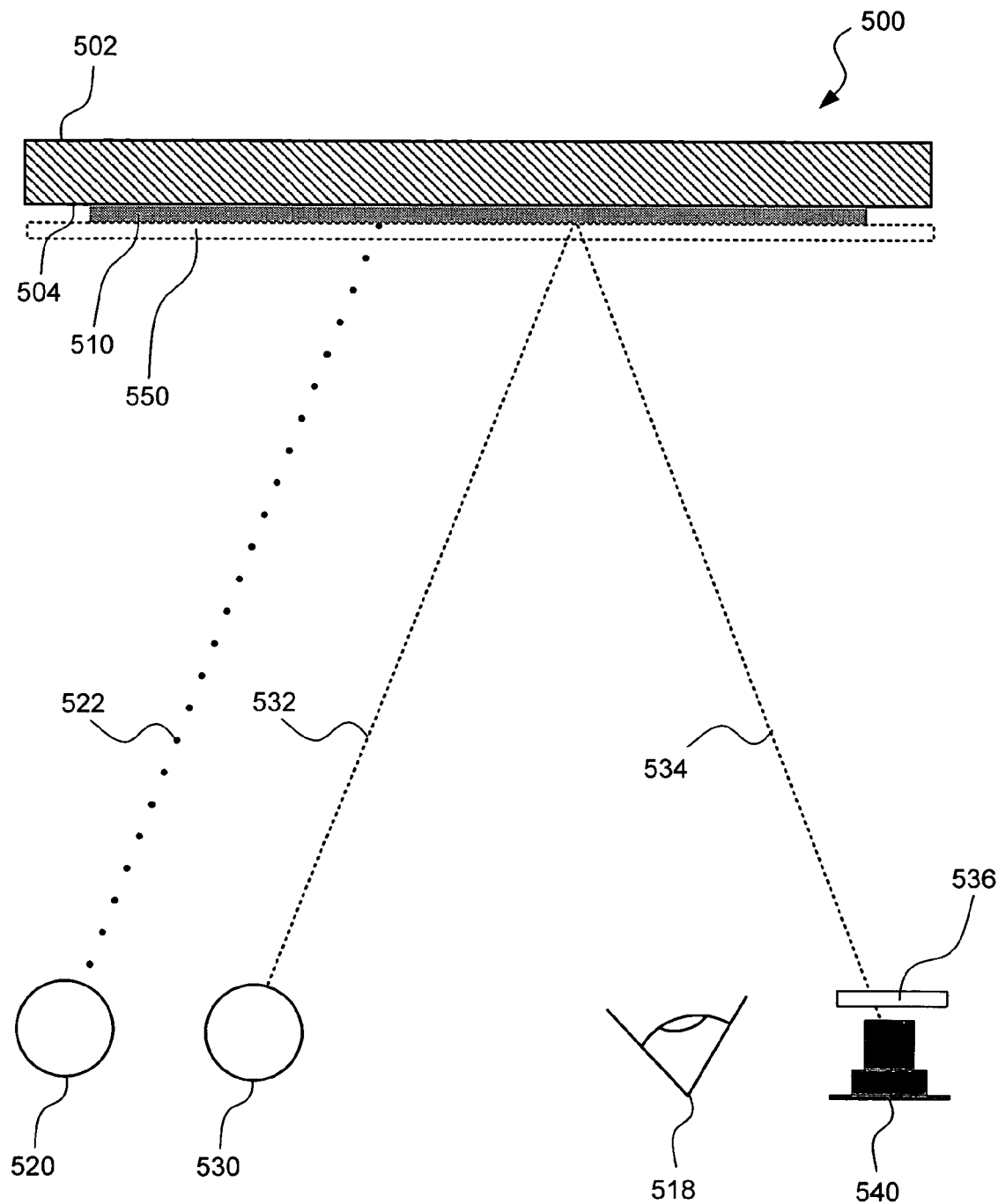
FIG. 5B illustrates an enlarged cross-sectional view of an encoded item with the marking concealed with a coating according to an embodiment of the present invention so that the code is not visibly apparent to a human observer.

FIGS. 5A and 5B illustrate a physical object 500 bearing a marking 510 with and without, respectively, a visible light-blocking coating 550 according to an embodiment of the present invention. Physical object 500, as shown in both FIGS. 5A and 5B, is a thin object such as a tile, chip, playing card, or similar object. Physical object 500 includes a first face 502 and a second face 504. Marking 510 is disposed on second face 504 of physical object 500, although marking 510 could appear on both faces 502 and 504 of physical object 500, or different markings 510 could appear on different faces of physical object 500. Marking 510 may be a bar code 410 (FIG. 4A), a radial code 420 (FIG. 4B), a matrix code 430 (FIG. 4C) or any other pattern. For purposes of this explanation, it is assumed that marking 510 is detectable both in the IR and visible light spectra.

In FIG. 5A, marking 510 is not coated with a visible light-blocking coating. As a result, when marking 510 is exposed to visible light source 520, visible light beam 522 illuminates marking 510. Marking 510 reflects visible light beam 522, resulting in visible light reflection 524 that can be discerned by a human eye 528. As a result, information encoded in marking 510 is detectable by human eye 528. At the same time, marking 510 is exposed to an IR light source 530. An IR light beam 532 also illuminates marking 510, resulting in an IR light reflection 534. IR light reflection 534 passes through IR pass filter 86a and is detected by digital video camera 68.

In FIG. 5B, however, marking 510 is concealed by application of visible light-blocking coating 550. As was the case in the example of FIG. 5A, when marking 510 is exposed to IR light source 530, IR light reflection 534 passes through IR pass filter 86a and is detected by digital video camera 68. However, unlike the example of FIG. 5A, when object 500 is illuminated by visible light source 520, visible light beam 522 is not reflected. Instead, visible light beam 522 is absorbed by visible light-blocking coating 550. As a result, while the information encoded in marking 510 is still discernible by digital video camera 68, marking 510 is neither discernible nor readable by human eye 528. Thus, marking 510 may be formed with materials visible in both the IR and visible light spectra, but marking 510 will be substantially invisible and undetectable to the human eye.

Logical Steps for Deploying Visible-Light Blocking Coating(s)

FIG. 6 is a flow diagram 600 illustrating the logical steps for applying visible light-blocking coatings over IR-discernible markings (or over UV-discernible markings, if the vision sensing system is responsive to UV light; if a UV vision sensing system is employed, then the term IR in this discussion can be replaced with the term UV). Flow diagram 600 begins at a step 602. At a step 604, IR-discernible markings to be used are chosen. The IR-discernible markings selected may be chosen from among the optical coding types previously described in connection with FIGS. 4A-4C, or any other type of optically recognizable shapes or forms. The selection may be based on the nature of the digital video camera used, the size and/or shape of surfaces to which the marking is to be applied, the application with which the marking is to be used, and a number of other factors.

At a step 606, one or more surfaces on an object that will bear IR-discernible markings are identified. As will described further below, it may be desirable for one or more sides or surfaces of an object to bear IR-discernible markings. The same marking or different markings may appear on multiple surfaces of the same physical object. At a step 608, the selected IR-discernible markings are disposed on the selected surfaces. The markings may be placed on the surfaces by imprinting, screening, transfers, appliqués, or any other process suitable to allow the marking to adhere to the surface.

At a step 610, a suitable visible light-blocking coating is selected to be applied over the IR-discernible markings. According to one embodiment of the present invention, the visible light-blocking coating includes one or more layers of a fluid coating applied to the object over the marking. The fluid coating may include a paint, a lacquer, a varnish, or other fluid coating. The fluid coating should be selected so that one or more fluids combined result in a layer that, while largely transparent to light in the IR spectrum, is generally opaque to light in the visible spectrum. As a result, and as was described above in connection with FIG. 5B, the layer created by the coating enables a digital video camera to discern the marking while preventing a human eye from being able to detect and/or decode the marking.

In one embodiment of the present invention, a single layer of a single color of paint results in a layer that is largely transparent to light in the IR spectrum while being generally opaque to visible light. One suitable paint includes Liquitex™ Acrylic Artistic Color acrylic paint in the color Naphthol Crimson; this paint is an artist's acrylic paint. In another embodiment of the present invention, application of multiple colors of paint result in a layer that is largely transparent to light in the IR spectrum, while being generally opaque to visible light. For example, one suitable composite layer is formed of coatings of Design Master™ Color Tool Spray Paint, in the colors Deep Blue #743 and Cranberry #713, which are commonly used for floral coloring. It should be noted that the coating selected need not have the desired optical properties in a transitional state. In other words, a paint that has the desired optical properties upon being dried or otherwise cured is suitable, even if the same paint lacks those same physical properties while the paint is in a liquid state or while it remains "wet."

At a step 612, the visible light-blocking coating is applied over the marking. The fluid coating suitably may be applied by brushing, spraying, flooring, dipping, electrostatic application, or any other suitable means of application.

Alternatively, instead of applying the fluid coating directly to the surface of a physical object over the marking, the fluid coating may be applied to an intermediate substrate. One substrate may include a thin sheet of generally transparent plastic, vinyl, or similar material. The fluid coating may be applied to the substrate, and the coated substrate then attached to the surface of the object over the marking. A section of the substrate sufficiently large to cover the marking may be formed and then covered with the fluid coating. As a further alternative, a sheet of the substrate larger than the marking may be covered with the fluid coating, with portions of the substrate subsequently being cut from it and attached to the object over the marking.

In this embodiment of the invention, the coated layer of substrate acts as a filter. However, unlike conventional filters, the substrate need not be formed with the desired or needed optical properties for the particular application. Instead, commonly available materials that are generally transparent to light in the visible and/or IR spectra may be used. Coating readily available materials instead of having filter material specially fabricated can reduce production costs. The ability to thereby produce quantities of materials with desired visible light-blocking properties makes producing small quantities of the materials cost effective when the same may not be true if specially fabricated materials otherwise would need to be produced.

At a decision step 614, it is determined if all desired objects have been encoded and the markings covered. If so, the flow diagram ends at a step 618. On the other hand, if it is determined at decision step 614 that objects or surfaces have yet to be an encoded and covered, at a step 616, the flow diagram proceeds to a next object and flow diagram 600 loops to block 606.

Applications for which Discrete, Invisible Markings are Desirable

Visible light-blocking coatings have a number of applications for masking IR-discernible markings for which attachment of conventional filters may not be suitable. Attachment of conventional filters may add significant cost, bulk, and or weight to physical objects with which they are used. By contrast, applications for visible light-blocking coatings make a number of applications available and practical.

Figure 7A:
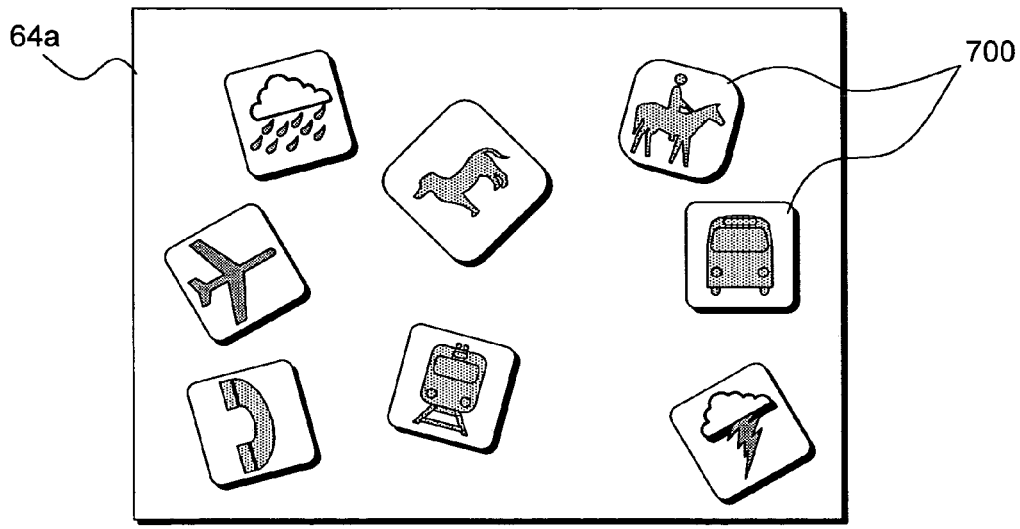
Figure 7B:
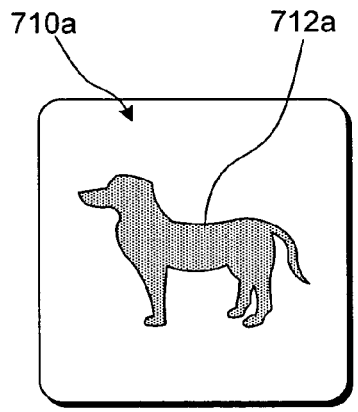
Figure 7C:
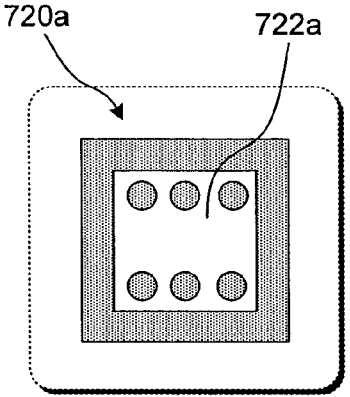
Figure 7D:
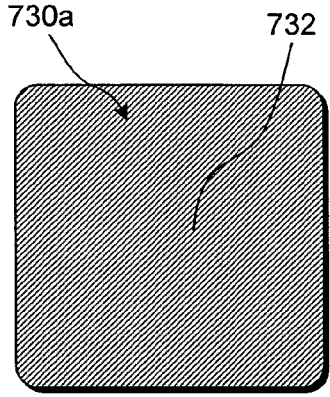
Figure 7E:
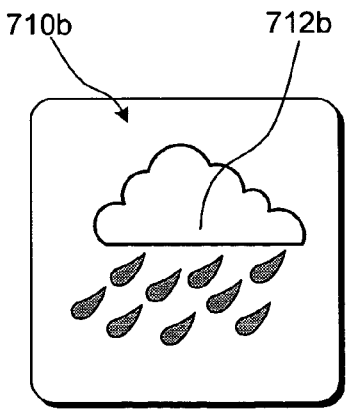
Figure 7F:
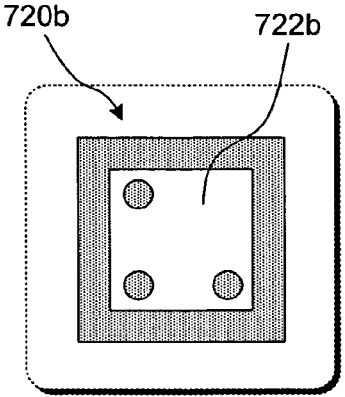

FIGS. 7A-7G illustrate one suitable application for applying a visible light-blocking coating to a thin object. In short, in the application for display surface 64*a* of interactive display table 70 (FIG. 2) depicted, placing cards 700 on display surface 64*a* causes interactive display system to make a noise that is associated with an images on each of the cards. More particularly, FIG. 7A shows display surface 64*a* of interactive display system on which a number of cards 700 have been placed. As shown in the examples of FIG. 7B and FIG. 7E, cards 700 each bear different images 712*a* and 712*b* on first sides 710*a* and 710*b*, respectively. As shown in FIGS. 7C and 7F, on second sides 720*a* and 720*b*, each of the cards carries an optical marking or code. Different markings 722*a* and 722*b* correspond with different images 712*a* and 712*b*. In one application supported by interactive display table 70, placing cards 710*a* and 710*b* on display surface 64*a* enables the display surface to respond to markings 722*a* and 722*b* by playing sounds associated with each card placed on the display surface.

Figure 7G:
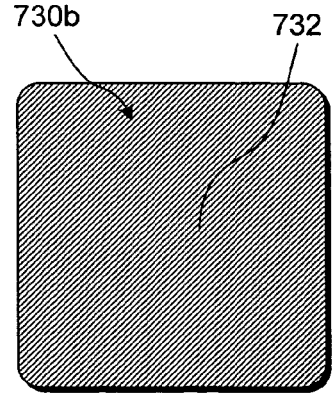

However, while the application would be functional, in an era where nearly every store uses Universal Product Code (UPC) bar code markings to determine prices and changes to inventory when a product is sold, permitting markings 722*a* and 722*b* to be visible would make it apparent to anyone inspecting the cards how the interactive display table is able to identify each card. As a result, the product would lack the mystique or enjoyment that is attained by hiding markings 722*a* and 722*b* from the view of the user's eye. Thus, using embodiments of the present invention, a visible light-blocking coating 732, as shown in FIG. 7B, is applied to back faces 720*a* and 720*b* of each of cards 710*a* and 710*b*. As shown in FIGS. 7D and 7G, with visible light-blocking coating 732 applied to cards 710*a* and 710*b*, finished back faces 730*a* and 730*b* appear identical to an unaided eye because the coating hides the marking that identifies the cards to the vision sensing system of the interactive display system. The interactive display system thus can generate different and appropriate sounds matching images on first sides 710*a* and 710*b* of cards 700 placed on display surface 64*a* even when back faces such as 730*a* and 730*b* appear identical to the unaided eye. Consequently, the interactive display system appears to operate with a certain mystery and mystique, adding to the enjoyment of the application by the user.

Figure 8A:
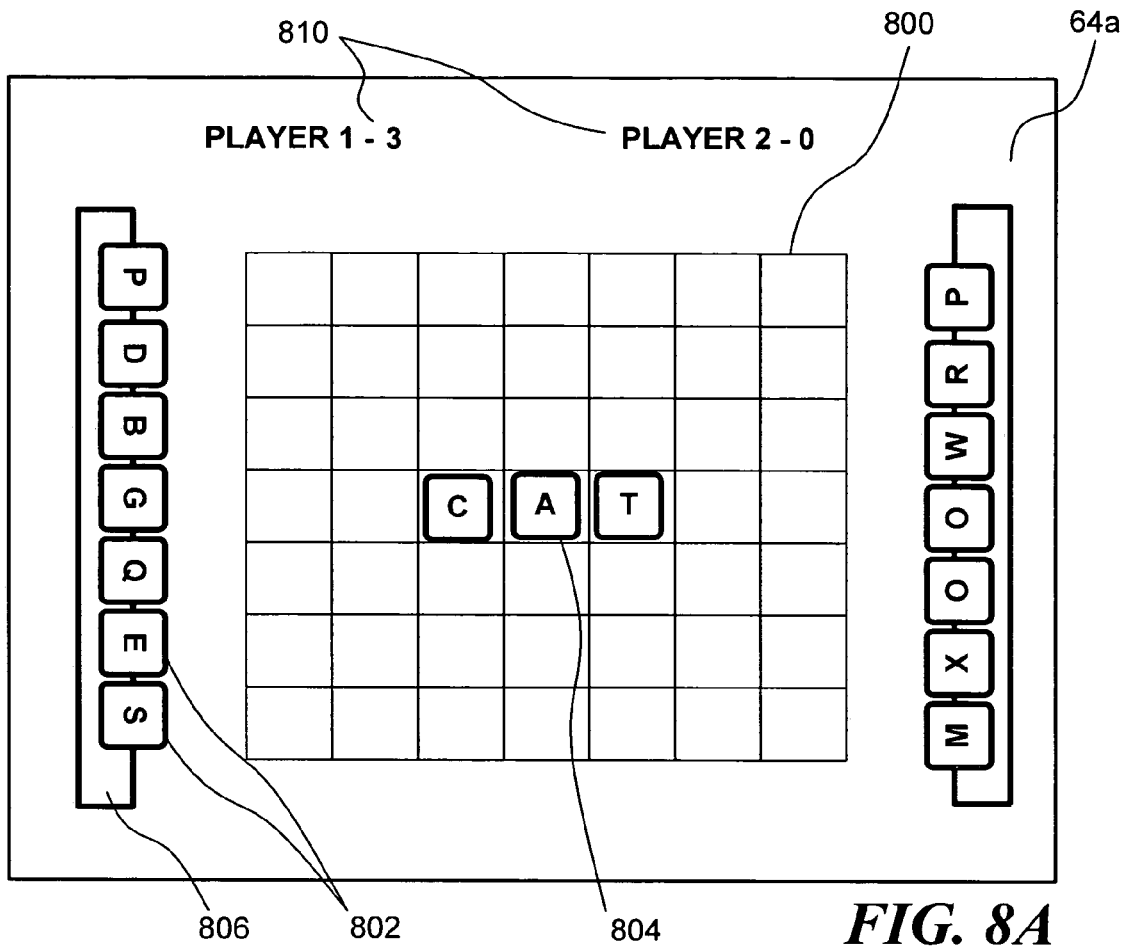
Figure 8B:
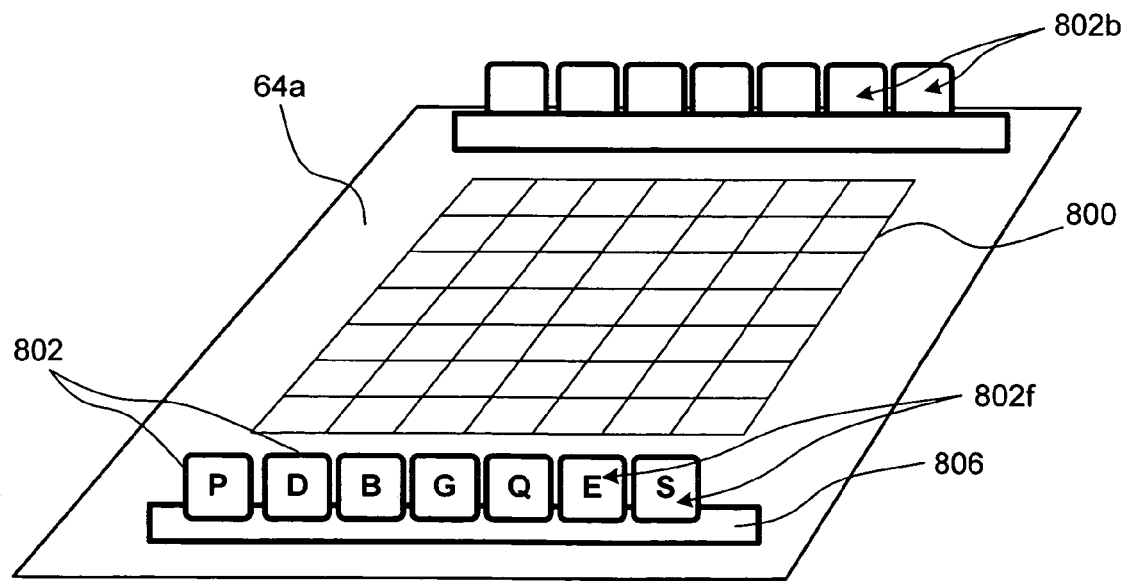

Another application for the interactive display system is depicted in FIGS. 8A-8B. The application shown involves a word game played on a grid 800. Grid 800 can be produced on display surface 64*a* by the interactive display system using video projector 70 (FIG. 2). However, while the game board may be virtual, users still can engage the game board using real game pieces. In particular, users can use letter tiles 802 to form words 804 on virtual grid 800, thereby engaging in a gaming environment that is part real and part virtual.

In addition to the novelty of a game environment that is both real and virtual, such an environment also affords a number of other advantages. For example, in contrast to an physical version of the game where users manually need to tally their scores, including any bonuses accrued, the combined real and virtual game played on display surface 64a can tally and generate scoring totals 810 for the users automatically. Score computation can be facilitated by coding tiles 802 such that display surface 64a can identify the values of tiles 802 that are placed on grid 800. One problem with this, as can be seen in FIG. 8B, is that opponents should not know the tiles 800 that other players have resting on their tile holders 806. In other words, each of the users should be able to keep secret the letters and values that are shown on front faces 802f of tiles 802 and not have those values betrayed to opponents by visually apparent markings on back faces 802b of tiles 802 until each player actually plays tiles 802.

To persons familiar with such word games, it will be understood that tiles 802 are small and relatively thin. Outfitting tiles 802 with IR-discernible coatings and then covering those coatings with thick and visible light-blocking filters could make the tiles 802 bulky and cumbersome to handle. Certainly, manufacturing and attaching such filters to many tiles 802—tiles 802 generally are made of plastic or wood and are otherwise inexpensive to mass-produce—would add significantly to their production costs. However, using embodiments of the present invention, TR-discernible markings can readily be applied to each of the tiles 802 and then covered with visible light-blocking coating, as described above, adding relatively little extra cost. As a result, the strategy and gamesmanship of the game is preserved, while exploiting the functionality inherent in the interactive display system to read values represent codes disposed on back faces 802b of tiles 802.

In still another useful application of the present invention, embodiments may even be used to conceal IR-discernible markings on playing cards. As a result, using a suitably—but not unfairly—"marked" deck of cards, one or more users can play a card game on the interactive display system. Because embodiments of the present invention employ very thin coatings that are able to block visible light, the card game can be played with cards that are pliable and easily shuffled like conventional playing cards, while providing the advantage that the vision sensing system can identify each of the cards placed on the display surface of the interactive display system.

Figure 9:
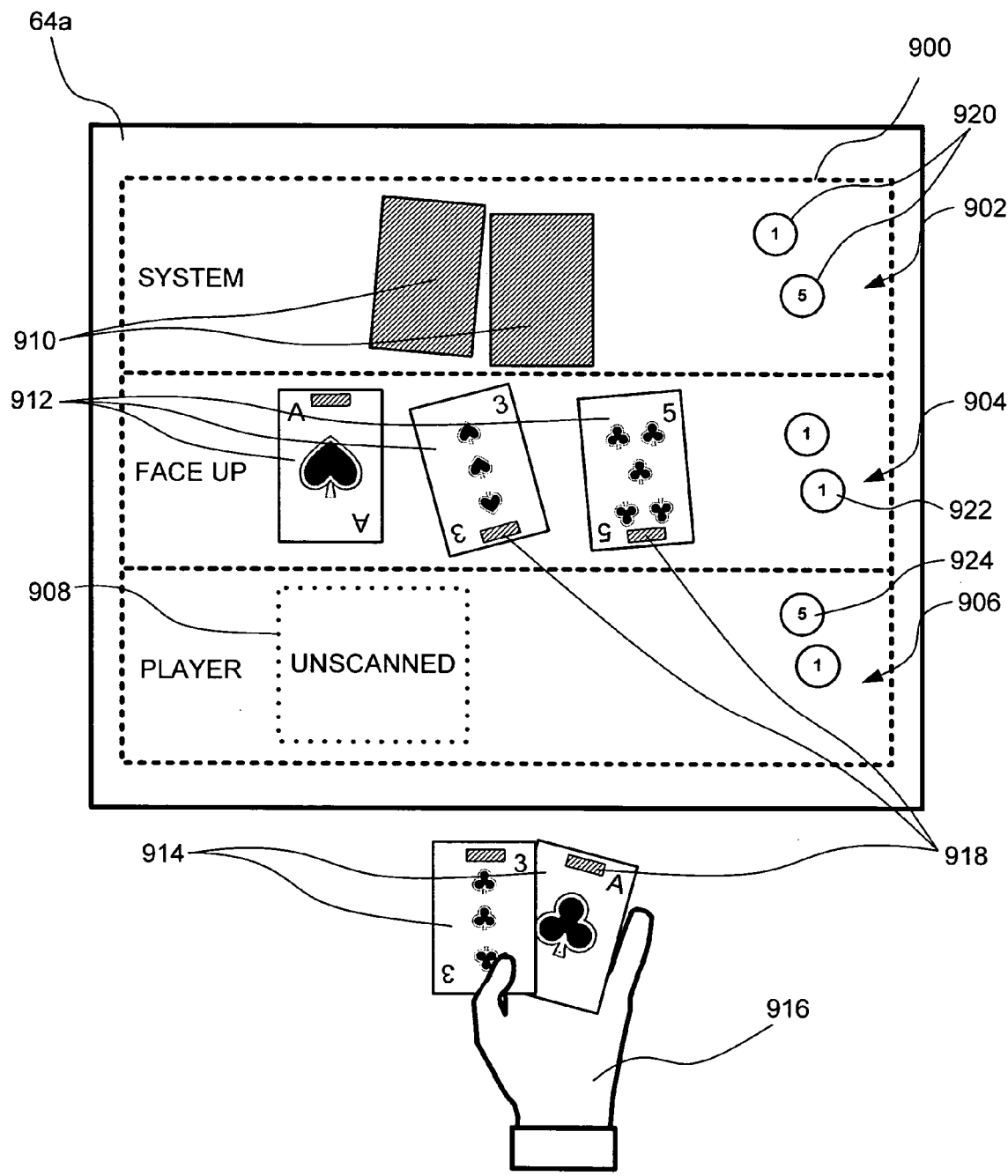

As shown in FIG. 9, display surface 64a presents a grid 900 delineated into a system zone 902, a face-up zone 904, and a player zone 906. Such a grid 900 is suitable for card games such as "Texas Hold 'Em" poker, where multiple players (and in this case, one of the players is the interactive display system) attempt to build winning hands using a combination of cards in their own "hands" and in the faceup area 904. In the "Texas Hold 'Em" example of FIG. 9, cards 910 are dealt to the interactive display system by placing cards 910 face down in system area 902. Cards 912 are placed face up in face up area 904 for both players to use. Cards 914 are dealt to a real player by placing them in player area 906 in an unscanned region 908 that is not viewed by the logic of the interactive display system until and unless the cards disposed there are to be shown; alternatively, the user can hold cards 914 in a user's hand 916. In this game, only the interactive display system should be able to "see" interactive display system cards 910, and only the user should be able to see user cards 914, while both the interactive display system and the user should be able to "see" face up cards 912.

Using an embodiment of the present invention, an IR-discernible coding is applied to the backs of all cards in the deck, and the markings are covered using a visible-light blocking coating so that the backs of the cards cannot be read by an unaided human eye. Thus, when cards 912 are placed face up on display surface 64a, cards 812 can be read by the interactive display system and the user to determine their values. On the other hand, cards 910 dealt to the interactive display system can be read by the interactive display system by their coded values, but cannot be read by the user. The interactive display system can be configured to identify cards from the patterns on the faces of the cards, or a second marking or coding 918 can be placed on the faces of the cards as well. Second markings 918 also are covered by a visible light-blocking coating to add to the mystique of the game, as described above in connection with FIGS. 7A-7B. Also, cards 914 dealt to a user cannot be read by the interactive display system—or by other human players—as long as cards 914 are left face down in unscanned region 908 of player area 906, or held in user's hand 916. When a user wants to show user's cards 914, the user can lay cards 914 on display surface 64a of the interactive display system.

Either the interactive display system or the user can request different cards from a deck (not shown), bet by moving chips 920 (or in the case of the interactive display system, by indicating chips 920 that are to be moved). Chips 920 can be encoded to have different values, such as $1 for chips 922 and $5 for chips 924, which may be coded on one or both sides to be read by the interactive display system.

Again, embodiments of the present invention makes coding playing cards and other relatively thin objects practical. By contrast, attempting to apply conventional filters to playing cards or other thin object to hide IR markings would make the object too thick and too cumbersome to be shuffled, dealt, and conveniently held. Embodiments of the present invention enable IR-discernible codes to be concealed without adding unreasonable weight and or thickness to the cards and other types of objects.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for concealing a marking discernible by a sensor that is sensitive to light in a non-visible spectrum, comprising the steps of:
    (a) identifying at least a portion of an object bearing the marking;
    (b) choosing at least one fluid coating having properties that include:
        (i) at least a partial opacity to light in a visible spectrum; and
        (ii) at least a partial transparency to light in the non-visible spectrum; and
    (c) applying the at least one fluid coating over the marking such that the marking remains discernible in the non-visible spectrum while becoming at least partially invisible in the visible spectrum.

2. The method of claim 1, wherein the object comprises a game piece having at least one surface bearing content that an opponent should not be able to see during at least a portion of a game in which the game piece is used.

3. The method of claim 2, wherein the game piece includes at least one of:
(a) a playing card;
(b) a chip;
(c) a puck;
(d) a tile; and
(e) a token.

4. The method of claim 1, wherein the marking includes at least one of:
(a) a bar code;
(b) a matrix code;
(c) a radial code;
(d) a gray scale code; and
(e) an identifiable differentiable shape.

5. The method of claim 1, wherein the at least one fluid coating includes at least one of:
(a) a paint;
(b) a lacquer; and
(c) a varnish.

6. The method of claim 5, wherein the at least one fluid coating includes a specific color of the paint.

7. The method of claim 6, wherein the paint comprises an acrylic paint that is substantially crimson in color.

8. The method of claim 5, further comprising the step of applying a plurality of fluid coatings to the object over the marking, such that a combination of fluid coatings disposed over the marking enables the marking to remain identifiable in the non-visible spectrum, while being substantially invisible in the visible spectrum.

9. The method of claim 8, wherein the plurality of fluid coatings includes coatings of a specific blue color paint and a specific red color paint.

10. The method of claim 1, wherein the step of applying the at least one fluid coating includes of applying the at least one fluid coating to the object by at least one of the steps of:
(a) brushing;
(b) spraying;
(c) dipping;
(d) pouring; and
(e) electrostatic deposition.

11. The method of claim 1, further comprising the steps of:
(a) providing a thin substrate that is at least partially transparent in the visible spectrum and in the non-visible spectrum;
(b) applying the at least one fluid coating to the thin substrate; and
(c) attaching the thin substrate to the object over the marking.

12. The method of claim 1 further comprising the steps of:
(a) applying the at least one fluid coating to a sheet of the thin substrate, the sheet being sufficiently large to cover an area larger than the marking on the object; and
(b) cutting a section from the sheet sufficiently large to cover the marking that is then mounted to the object over the marking.

13. The method of claim 1, wherein the at least one fluid coating possesses the properties of at least partial opacity to light in the visible spectrum and at least partial transparency to light in the non-visible spectrum when the at least one fluid coating is at least one of dried and cured.

14. A method for encoding an object with a code detectable by an infrared sensor but not apparent to a human eye, comprising the steps of:
(a) applying the code on the object, the code including:
(i) a pattern detectable by the infrared sensor; and
(ii) a material used in forming the pattern that is detectable in the infrared spectrum;
(b) choosing a colored paint having a composition such that the colored paint has:
(i) at least a partial opacity to light in the visible spectrum; and
(ii) at least a partial transparency to light in the infrared spectrum; and
(c) applying the colored paint to a portion of the object on which the code is applied such that the code remains detectable in the near infrared spectrum while becoming largely invisible in the visible spectrum, so that the code is not apparent to the human eye.

15. The method of claim 14, wherein the object includes a game piece having at least one surface bearing content in the pattern that a player should not be able to see during at least a portion of a game in which the game piece is used.

16. The method of claim 15, wherein the game piece includes at least one of:
(a) a playing card;
(b) a chip;
(c) a puck;
(d) a tile; and
(e) a token.

17. The method of claim 14, wherein the code includes at least one of:
(a) a bar code;
(b) a matrix code;
(c) a radial code;
(d) a gray scale code; and
(e) an identifiable differentiable shape.

18. The method of claim 14, wherein the colored paint includes an acrylic paint of a specific color.

19. The method of claim 14, wherein the colored paint includes a plurality of coats of fluid coatings, such that a combination of the fluid coatings disposed over the pattern enable the pattern to remain detectable in the infrared spectrum while becoming largely invisible to the human eye in the visible spectrum.

20. The method of claim 19, wherein the plurality of coats comprise a specific first color of and a specific second color of paint, the first color being substantially different than the second color.

21. The method of claim 14, wherein the step of applying the colored paint to the object includes at least one of the steps of:
(a) brushing the colored paint onto the object;
(b) spraying the object with the colored paint;
(c) dipping the object into the colored paint;
(d) pouring the colored paint onto the object; and
(e) electrostatic deposition of the colored paint onto the object.

22. The method of claim 14, further comprising the steps of:
(a) providing a thin substrate that is generally transparent in the visible spectrum and in the infrared spectrum;
(b) applying the colored paint to the thin substrate; and
(c) attaching the thin substrate to the object over the code.

23. The method of claim 22, further comprising the steps of:
(a) applying the colored paint to a sheet of the thin substrate, the sheet being sufficiently large to cover an area larger than the code on the object; and
(b) cutting a section from the sheet sufficiently large to cover the code on the object.

24. A system for providing input to a software application that is being executed, comprising:
  (a) a display surface adjacent to which an object having a marking thereon can be disposed, said display surface displaying images determined by the software application;
  (b) a light sensor disposed to sense non-visible light reflected from the object, producing a corresponding signal;
  (c) a processor in communication with the light sensor;
  (d) a memory in communication with the processor, the memory storing data and machine instructions that cause the processor to carry out a plurality of functions, including:
    (i) executing the software application; and
    (ii) detecting the marking on the object in response to the signal produced by the light sensor, when the object is disposed adjacent to the display surface, the signal produced by the light sensor comprises the input to the system; and
  (e) wherein the object includes:
    (i) a marking discernible by the light sensor in response to the non-visible light that is reflected from the marking; and
    (ii) a coating applied over the marking and having properties that include:
      (A) at least a partial opacity to light in the visible spectrum; and
      (B) at least a partial transparency to light in the non-visible spectrum, so that the coating substantially prevents the marking on the object from being visually discernible to a human eye.

25. The system of claim 24, wherein the software application comprises a game, and wherein the object includes a game piece having at least one surface bearing content that should not be visible to a player of the game during at least a portion of the game.

26. The system of claim 25, wherein the game piece includes at least one of:
  (a) a playing card;
  (b) a chip;
  (c) a puck;
  (d) a tile; and
  (e) a token.

27. The system of claim 25, wherein the portion of the game piece bearing the marking includes at least one face of the game piece.

28. The system of claim 24, wherein the marking includes at least one of:
  (a) a bar code;
  (b) a matrix code;
  (c) a radial code;
  (d) a gray scale code; and
  (e) an identifiable differentiable shape.

29. The system of claim 24, wherein the coating includes at least one of:
  (a) a paint;
  (b) a lacquer; and
  (c) a varnish.

30. The system of claim 29, wherein the coating includes a specific color of an acrylic paint.

31. The system of claim 29, wherein the coating includes a plurality of layers, such that the plurality of layers disposed over the marking enable the marking to remain detectable in the non-visible spectrum while being largely invisible to a human eye in the visible spectrum.

32. The system of claim 31, wherein the plurality of layers includes a paint of a first color and a paint of a second color, the first color being substantially different than the second color.

33. The system of claim 24, wherein the coating is applied to a thin substrate that is substantially transparent in the visible spectrum and in the non-visible spectrum, and wherein the thin substrate is attached to the object over the marking.

34. An apparatus configured to be identifiable by a light sensor that is sensitive to light in a non-visible spectrum, comprising:
  (a) an object;
  (b) a marking disposed on the object, the marking comprising a material that is selected to reflect light in the non-visible spectrum that is discernible by the light sensor; and
  (c) coating applied over the marking that has:
    (i) at least a partial opacity to light in the visible spectrum; and
    (ii) at least a partial transparency to light in the non-visible spectrum.

35. The apparatus of claim 34, wherein the object comprises a game piece for use in a game and having at least one surface bearing content comprising the marking that a player of the game should be unable to discern during at least a portion of the game.

36. The apparatus of claim 35, wherein the game piece includes at least one of:
  (a) a playing card;
  (b) a chip;
  (c) a puck;
  (d) a tile; and
  (e) a token.

37. The apparatus of claim 34, wherein the marking includes at least one of:
  (a) a bar code;
  (b) a matrix code;
  (c) a radial code;
  (d) a gray scale code; and
  (e) an identifiable differentiable shape.

38. The apparatus of claim 34, wherein the coating comprises a specific color of paint.

39. The apparatus of claim 34, wherein the coating includes a plurality of layers disposed over the marking, the layers being selected so that the marking remains detectable in the non-visible spectrum while being substantially invisible in the visible spectrum.

40. The apparatus of claim 39, wherein the plurality of layers includes a first color of paint and a second color of paint, the first color being substantially different than the second color.

41. The apparatus of claim 34, wherein the coating is applied to a thin substrate that is substantially transparent in the visible spectrum and in the non-visible spectrum, and the thin substrate being attached to the object over the marking.

42. The apparatus of claim 34, wherein the non-visible spectrum comprises infrared light.

* * * * *